United States Patent
Green

(10) Patent No.: US 6,670,004 B1
(45) Date of Patent: Dec. 30, 2003

(54) LAMINATED NYLON AIR BRAKE TUBING

(75) Inventor: Edward A. Green, Mantua, OH (US)

(73) Assignee: Saint-Gobain Performance Plastics Corporation, Wayne, NJ (US)

(*) Notice: Subject to any disclaimer, the term of this patent is extended or adjusted under 35 U.S.C. 154(b) by 0 days.

(21) Appl. No.: 09/631,024

(22) Filed: Aug. 2, 2000

(51) Int. Cl.[7] ............................................. B32B 27/34
(52) U.S. Cl. ...................... 428/35.7; 138/125; 138/137; 138/140; 138/141; 138/DIG. 7; 428/36.91; 428/474.9; 428/476.1
(58) Field of Search ................................ 138/137, 125, 138/140, 141, DIG. 7; 428/35.7, 36.91, 474.9, 476.1

(56) References Cited

U.S. PATENT DOCUMENTS

| | | | |
|---|---|---|---|
| 3,062,241 A | 11/1962 | Brumbach | |
| 3,762,986 A | 10/1973 | Bhuta et al. | 161/227 |
| 4,862,923 A | 9/1989 | Kitami et al. | 138/125 |
| 4,881,576 A | 11/1989 | Kitami et al. | 138/125 |
| 4,907,625 A * | 3/1990 | Ito et al. | 138/126 |
| 5,038,833 A | 8/1991 | Brunnhofer | 138/137 |
| 5,076,329 A | 12/1991 | Brunnhofer | 138/137 |
| 5,156,699 A | 10/1992 | Nakano et al. | 156/149 |
| 5,167,259 A | 12/1992 | Brunnhofer | 138/137 |
| 5,219,003 A | 6/1993 | Kerschbaumer | 138/137 |
| 5,313,987 A | 5/1994 | Rober et al. | 138/137 |
| 5,330,810 A | 7/1994 | Nishino | 428/36.91 |
| 5,362,530 A | 11/1994 | Kitami et al. | 428/36.2 |
| 5,383,087 A | 1/1995 | Noone et al. | 361/215 |
| 5,390,705 A | 2/1995 | Brunnhofer | 138/137 |
| 5,419,374 A | 5/1995 | Nawrot et al. | 138/137 |
| 5,425,817 A | 6/1995 | Mugge et al. | 138/137 |
| 5,449,024 A | 9/1995 | Rober et al. | 138/137 |
| 5,469,892 A | 11/1995 | Noone et al. | 138/121 |
| 5,474,822 A | 12/1995 | Rober et al. | 428/36.91 |
| 5,476,080 A | 12/1995 | Brunnhofer | 123/468 |
| 5,476,120 A | 12/1995 | Brunnhofer | 138/137 |
| 5,476,121 A | 12/1995 | Yoshikawa et al. | 138/138 |
| 5,478,620 A | 12/1995 | Mugge et al. | 428/36.91 |
| 5,500,263 A | 3/1996 | Rober et al. | 428/36.6 |
| 5,566,720 A | 10/1996 | Cheney et al. | 138/137 |
| 5,611,373 A | 3/1997 | Ashcraft | 138/113 |
| 5,622,210 A | 4/1997 | Crisman et al. | 138/104 |
| 5,628,532 A | 5/1997 | Ashcraft | 285/133.1 |
| 5,671,780 A | 9/1997 | Kertesz | 138/127 |
| 5,678,611 A | 10/1997 | Noone et al. | 138/137 |
| 5,693,284 A | 12/1997 | Mukawa | 264/513 |
| 5,706,864 A | 1/1998 | Pfleger | 138/121 |
| 5,706,865 A | 1/1998 | Douchet | 138/125 |
| 5,743,304 A | 4/1998 | Mitchell et al. | 138/137 |
| 5,814,384 A | 9/1998 | Akkapeddi et al. | 428/35.7 |
| 5,865,216 A | 2/1999 | Youngs | 138/135 |
| 5,865,218 A | 2/1999 | Noone et al. | 138/137 |
| 5,884,671 A | 3/1999 | Noone et al. | 138/137 |
| 5,884,672 A | 3/1999 | Noone et al. | 138/137 |
| 5,996,642 A | 12/1999 | Noone et al. | 138/137 |
| 6,032,699 A | 3/2000 | Cochran et al. | 138/104 |
| 6,041,826 A | 3/2000 | Lorek et al. | 138/137 |

FOREIGN PATENT DOCUMENTS

| | | | |
|---|---|---|---|
| GB | 2048427 A | 12/1980 | |
| JP | 4270759 A | 9/1992 | C08L/77/00 |
| JP | 04270759 A * | 9/1992 | |

* cited by examiner

*Primary Examiner*—Sandra M. Nolan
(74) *Attorney, Agent, or Firm*—Wood, Herron & Evans, L.L.P.

(57) ABSTRACT

A laminated nylon air brake tubing is formed from outer and inner layers of nylon 11 or nylon 12 with inner layers of nylon 6. The nylon 6 and nylon 11 or 12 layers are adhered together by a tie layer. The tie layer is preferably a nylon 6–12 or an anhydride modified polyolefin. The air brake tubing has improved high temperature strength and low temperature impact resistance characteristics.

3 Claims, 1 Drawing Sheet

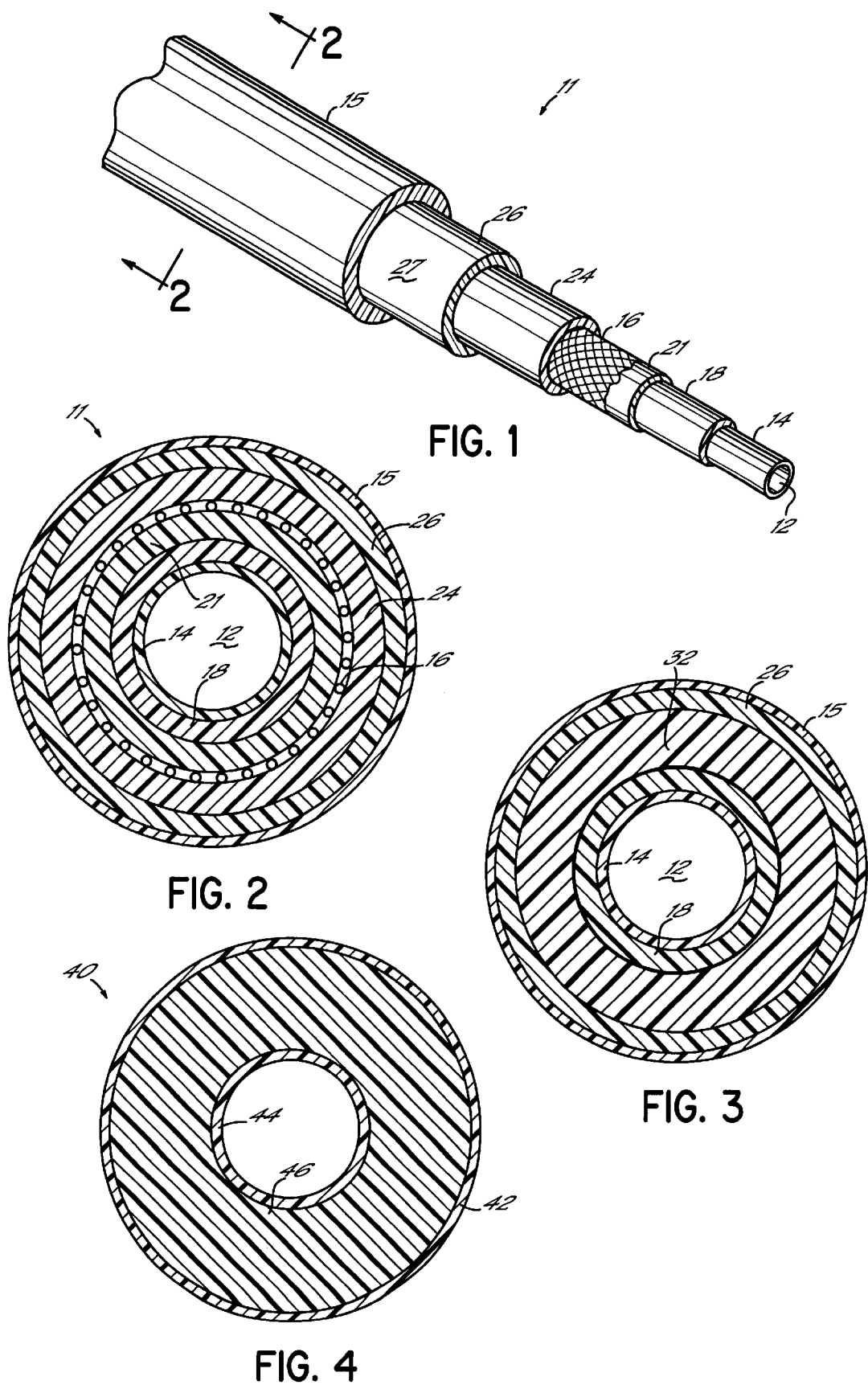

LAMINATED NYLON AIR BRAKE TUBING

BACKGROUND

Air brake systems are frequently employed in heavy duty vehicles such as tractor trailers and the like. In such systems the brake system is activated by pressurized air transported through tubing. Metal tubing can be employed, however nylon tubing is generally preferred and specifically polyester reinforced nylon tubing. Nylon tubing such as disclosed in Brumbach, U.S. Pat. No. 3,062,241 has met with exceptional success and has been established as the industry standard.

This product includes a nylon 11 or 12 inner and outer layer separated by an intermediate polyester fiber layer. The inner and outer layers are laminated securely together and do not delaminate under operating conditions typically up to 150 psi over a wide temperature range i.e., from 40 to 200° F. Further nylon 11 and nylon 12 are well suited for automotive and truck applications. Their resistance to cracking and their fuel and water resistance are exceptional. Further they are not sensitive to stress cracking from zinc chloride as is nylon 6.

Nylon 11 and 12 present some concerns. In particular the cost and availability of these products is a concern. Nylon 11 is only manufactured by one company. Nylon 12 is made by four. Further nylon 11 and 12 are unsuitable for use in temperatures below −40° F. or extremely high temperatures i.e., higher than 200° F. In Europe, if resistance to higher temperatures is required, manufacturers typically utilize nylon 6. This is less expensive than nylon 11 and 12. But at low temperatures i.e., about −40° F., the unmodified nylon 6 tends to be brittle in cold impact.

Nylon 6 is also subject to stress cracking when contacted with zinc chloride and loses physical properties when saturated with water. Zinc chloride resistance is a problem in certain environments particularly where road salt is used to melt ice and snow or near the ocean. Many hose connectors are zinc plated and when contacted with sodium chloride from salt spray and the like, form zinc chloride which causes nylon 6 to break down. For this reason nylon 6 has not been accepted for use in the United States and is only used in limited applications in other countries.

Further nylon 6 per se is not compatible with nylon 11 or 12 and thus forming a laminated tubing using layers of nylon 11 or 12 is problematic. Until now because of the application requirements and compatibility requirements, laminated tubing from nylon 6 and nylon 12 or nylon 11 have not been feasible.

SUMMARY OF THE INVENTION

The present invention is premised on the realization that laminated reinforced nylon air brake tubing can be formed from layers of nylon 11 or 12 and nylon 6 or 6-6 by incorporating an intermediate tie layer and at the same time utilizing modified nylon 6 or nylon 6-6. In particular the tie layer for use in the present invention is a nylon 6-12 or a maleic anhydride modified polyolefin which is compatible with nylon 6, nylon 6-6 and nylon 11 or nylon 12 and in particular compatible with even the modified nylon 6 or nylon 6-6.

By utilizing a modified nylon 6 or 6-6, the disadvantages of nylon 6 are reduced and at the same time it remains compatible with the tie layer. By utilizing inner and outer layers of nylon 11 or 12, the threats to nylon 6 from environmental concerns including moisture and zinc chloride are eliminated and further this is all accomplished while retaining the high temperature advantages of nylon 6 or 6-6.

The invention will be further appreciated in light of the following detailed description and drawings in which:

BRIEF DESCRIPTION OF THE DRAWINGS

FIG. 1 is a perspective view partially broken away of air brake tubing use in the present invention.

FIG. 2 is a cross-sectional view taken at lines 2—2 of FIG. 1.

FIG. 3 is a cross-sectional view of an alternate embodiment of the present invention.

FIG. 4 is a cross-sectional view of a second alternative embodiment of the present invention.

DETAILED DESCRIPTION

As shown in FIGS. 1 and 2, the present invention is air brake tubing 11 which includes an inner layer 14 and an outer layer 15 which defines a hollow interior area 12. Both the outer layer 15 and the inner layer 14 are formed from either nylon 11 or 12. Intermediate the inner layer 14 and outer layer 15 is at least one layer of nylon 6 or nylon 6-6 which is separated from the inner and outer layers 14 and 15 by tie layers. Inner layer 14 is optional and can be eliminated to reduce cost More particularly with respect to the embodiment shown in FIG. 1, the tubing includes innermost layer 14 bonded to a tie layer 18 bonded to a modified nylon 6 or 6-6 layer 21. Layer 21 is surrounded by a fiber layer or braiding layer 16. A second nylon 6 or 6-6 layer 24 surrounds the braiding 16 and in turn tie layer 26 connects the outer nylon layer 15 to layer 24.

Layers 14 and 15 are either nylon 11 or nylon 12. It is preferable to have these layers as thin as possible and generally outer layer 15 will be in the neighborhood of 0.005 to 0.015 inches thick preferably 0.007 inches. Inner layer 14 is preferably 0.001 to 0.005 inches preferably 0.002. The purpose of these layers is to provide isolation from the automotive environment such as moisture and ZnCl as well as others.

The nylon 11 and 12 layers are made from commercially available plasticized polyamide such as Rilsan BESNO p40 TL 89 (Nylon 11) or optionally plasticized nylon 12 which can be purchased from Huls under the brand name X7293 or Rilsan AESNO p401 TL. Alloys of nylon 11 and/or nylon 12 can also be employed. These alloys are simply nylon blended with less than 50% by weight of a compatible polymer such as maleic anhydride modified high density polyethylene. Hereinafter the term nylon 11 or 12 is intended to include both 100% nylon as well as comparably performing nylon blends.

The tie layers 26 and 18 are again preferably as thin as possible and are formed from a 0–100% nylon 6-12 blended with 0–100% maleic anhydride modified polyolefin. Nylon 6-12 is manufactured by Dupont sold as FE3646 or Huls B50565. This product may be used without further formulation but can be modified by the addition of plasticizer and impact modifiers. The maleic anhydride modified polyolefin is sold by Dupont as Fusabond 100D. The thickness of the tie layers 26 and 18 should be from 0.001 to 0.005 inches preferably 0.002 inches. The nylon 6-12 is preferred because its upper temperature limit is about 300° F. Preferably 95% to 100% nylon 6-12 is employed.

The Nylon 6 or 6-6 layer 21 generally has a thickness of 0.020 to about 0.030 preferably 0.025. Layer 24 is preferably 0.029 to 0.044 and preferably 0.035 inches thick. These layers provide the primary structural support for the tubing. Therefore their thickness is determined by application requirements.

The nylon 6 or nylon 6-6 is modified to provide improved low temperature characteristics by blending the nylon with suitable impact modifiers to improve these characteristics. Preferably the nylon 6 or 6-6 will include 5–15% of a compatible impact modifier such as a compatible elastomer. Suitable impact modifiers include maleic anhydride modified EPDM and styrene butadiene rubber.

The Nylon 6 or 6-6 should have the following physical characteristics:

Ambient flex modulus 40,000–100,000 psi preferably 85,000 psi
  Elastic modulus @230F 10,000–40,000 psi preferably 20,000 psi
  Yield strength @230F 1000–2000 psi preferably 1500 psi
  Izod impact strength @–70C 0.7–2.0 preferably 1.6
  A preferred Nylon 6 formula includes:
  High molecular weight (63%) Nylon 6 base resin
  Plasticizer—butyl benzene sulfonamide 10–16% preferably 14%
  Residual Nylon monomer—caprolactam 5–10% preferably 7%
  Maleic anhydride modified ethylene/propylene/non-conjugated diene elastomer 5–15% preferably 10% (Uniroyal Royaltuf 498)
  Maleic anhydride modified polyethylene 2–8% preferably 5% (Dupont Fusabond 493)
  Suitable heat and light stabilizers nominally 1%.

The reinforcing or braiding layer 16 comprises strands of polymeric fibers and preferably polyester fibers. The strands have a weight of from 500 to 1,000 denier with 840 denier being preferred. Commercially available polyester fiber is sold by Hoechst Celanese under the designation 840/70VAR. Although polyester is preferred and generally accepted, any strengthening fiber can be used such as nylon, rayon and aramid fibers.

To form the tubing 11 of the present invention, the inner nylon tube 14 is co-extruded along with the tie layer 18 and the first nylon 6 or 6-6 layer 21. The melt temperature of the nylon extruder should be from 450° F. to about 460° F. preferably about 450° F.

The braiding 16 is then applied over the first nylon 6 or 6-6 layer 21 by passing the three layer extruded tubing through a braider or fiber reinforcing apparatus. The reinforcing material may be braided, knitted or spirally wrapped wherein one strand of the material is applied in a pitch in one direction and another strand is applied over the first with a pitch in the opposite direction. The braider is preferably a counter rotating fiber reinforcing device. Preferably the braided layer is applied with six bobbins of fiber applied at from two to five picks per inch, preferably three picks per inch.

Once the braiding is applied, the outer three layers are co-extruded over the inner tubing in the same manner as the first three layers at the same temperatures. The formed tubing is then passed through a cooling bath. The resulting extruded product has an outer diameter of about 0.125 to about 0.75 inches and is ready for use.

To test the present invention a laminated hose was formed with layer 1 being the innermost layer:

Layer 1-Nylon 11, 0.007 in. Huls X7293
  Layer 2-Nylon 6-12 0.002 in. Dupont FE3646
  Layer 3-Nylon 60.2 in (above formulation)
  Layer 4-Polyester fiber—840 denier
  Layer 5-same as layer 3
  Layer 6-same as layer 2
  Layer 7-same as layer 1

This structure was compared to polyester fiber reinforced Nylon 11 tubing and Nylon 12 tubing.

High temperature and pressure performance were tested according to SAE 1131 which requires that the tubing withstands 450 psi for (5) minutes at 200° F. Both Nylon 11 and the improved composite product satisfied this requirement.

The test was then extended by raising the pressure until failure occurred. The Nylon 11 product failed as the pressure was increased and would not withstand 550 psi. The composite product withstood 600 psi for 5 min.

In another special high temperature comparison test, both products were pressurized to 150 psi and the temperature raised until failure, holding the temperature a minimum of one hour at each point.

The Nylon 11 product failed at 310° F.
The Nylon composite product did not fail at 340° F.
These samples and samples of nylon 12 tubing were also subject to a cold impact testing. The results are shown in Table I.

| Cold Impact Testing Below –40 F. | Comparison of composite nylon air brake product versus nylon 11 & 12 All testing done on ½" size SAE dimensional product. (20 samples) results gives average burst v | | | |
|---|---|---|---|---|
| SAE J844 Requirement TEST DEFINITION | 5/8/2000 SPEC REQUIREMENT | Nylon 11 TEST RESULTS | Nylon 12 TEST RESULTS | Composite 6/12 nylon TEST RESULTS |
| SAE Cold Temperature Impact @ –50 F. | No Fractures | no failures 1005 psi | no failures 1153 psi | no failures 1254 psi |
| SAE Cold Temperature Impact @ –60 F. | 80% min burst after impact | 11 failures in 20 samples | 7 failures in 20 samples | Not Tested |
| SAE Cold Temperature Impact @ –65 F. | 760 psi min | Not Tested | Not Tested | no failures 1230 psi |

These tests demonstrate the superior properties of the laminated tubing of the present invention.

FIG. 3 shows an alternate embodiment of the present invention wherein the fiber layer 16 is not employed. Thus only one nylon 6 or 6-6 layer 32 is formed separated from the inner nylon layer 14 and the outer nylon layer 15 by tie layers 26 and 18 respectively. Again these would be the same compositions previously discussed. This can be co-extruded in one step.

Surprisingly the present invention enables the manufacture of air brake tubing having a structure as shown in FIG. 4. The nylon 6-12 provides adequate cold impact strength as well as zinc chloride resistance to permit the elimination of the inner and outer nylon 11 or 12 layers of the embodiments shown in either FIG. 2 or FIG. 3. Thus, as shown in FIG. 4, the tubing 40 includes inner and outer nylon 6-12 layers 42 and 44 respectively which sandwich an intermediate thicker layer 46 of nylon 6 or nylon 6-6 . The thickness of layer 42 can be from 0.0002 inches up to about 0.15 inches although it is preferred to keep it as thin as possible. The inner nylon 6-12 layer 44 is not necessary in all applications. When used, it will have a thickness of about 0.0002 to about 0.1 inches.

Thus due to the compatibility of the nylon 6-12 and the combined functional characteristics of the laminated tubing itself, nylon 11 and nylon 12 can be completely eliminated from air brake tubing.

Thus the present invention provides a less expensive laminated air brake tubing while at the same time improving the high temperature strength of the tubing. Finally the tubing itself is not subject to delamination even at elevated pressure and temperature. This has been a description of the present invention along with the preferred method of practicing the invention. However the invention itself should be defined only by the appended claims wherein:

I claim:

1. Air brake tubing comprising a first outermost layer adjoining a second layer, adjoining a third layer, adjoining a fourth layer adjoining a fifth layer;

wherein said first layer is a nylon selected from the group consisting of nylon 11, nylon 12 and alloys thereof; and said second layer is a tie layer compatible with said first and third layers, said second layer is selected from the group consisting of impact modified Nylon 6, Nylon 6-12, maleic anhydride modified polyolefin, and blends of Nylon 6-12 and maleic anhydride modified polyolefin thereof;

said third layer comprises an impact modified nylon 6 having an ambient flex modulus of at least 40,000 and an elastic modulus at 230° F. of at least 10,000, a yield strength at 230° F. of at least 1,000 and an Izod impact strength of at least 70° of at least 0.7; and wherein said fourth layer is the same as said third layer and wherein said fifth layer is the same as said first layer.

2. Air brake tubing comprising an outermost first layer adjacent, a second layer adjacent, a third layer adjacent, a fourth layer adjacent, a fifth layer adjacent, a sixth layer, adjacent a seventh layer;

wherein said first layer and seventh layers are independently selected from a group consisting of nylon 11, nylon 12 and alloys thereof;

wherein said second layer and sixth layer independently are tie layers compatible with layers adjacent to said second and sixth layers, said tie layers are independently selected from the group consisting of Nylon 6-12 and blends with maleic anhydride modified polyolefin thereof;

wherein said third layer and fifth layer independently comprise impact modified nylon 6, Nylon 6, Nylon 6-6, or blends thereof, said third and fifth layers have an ambient flex modulus of at least 40,000 and an elastic modulus at 230° F. of at least 10,000, a yield strength at 230° F. of at least 1,000 and an Izod impact strength of at least 70° of at least 0.7; and wherein said fourth layer comprises a polyester fiber reinforcing layer, said fibers having a weight between 500 and 1000 demier.

3. Air brake tubing comprising a plurality of nylon layers at least one of said nylon layers being impact modified nylon 6 having the following physical characteristics:

ambient flex modulus of from 40,000 to 100,000 psi;

elastic modulus at 230° F. of from 10,000 to 40,000 psi;

yield strength at 230° F. of from 1,000 to 2,000 psi.

* * * * *